Patented May 9, 1933

1,907,801

UNITED STATES PATENT OFFICE

BENJAMIN R. HARRIS, OF CHICAGO, ILLINOIS

PROCESS FOR HYDRATING DESICCATED MATERIALS AND PRODUCT

No Drawing.   Application filed May 4, 1929. Serial No. 360,599.

My invention relates to a process for hydrating desiccated materials and an improved product or composition of matter adapted for use in carrying out my improved process, an object being to provide an improved product and process, as hereinafter more fully pointed out.

In the food industry and other arts, it frequently occurs that it is necessary to immerse a previously desiccated material in an aqueous medium in order to get it to imbibe water and to re-acquire some or most of the properties it originally possessed prior to being dehydrated.

In such instances, it frequently occurs that during the process of soaking in water or in an aqueous medium, the material, which may contain protein substance or other constituents, is attacked by fermenting or putrefying micro-organisms or enzymes, or both, so that by the time it has imbibed sufficient water, it has undergone deterioration or it has undergone some undesirable change.

Examples of this type of material are various dried fruits and vegetables, pimento flakes, dried yolks, dried whole mixed eggs, dried egg albumen, and various other mixtures of dried egg materials, and other materials which have had their natural moisture content substantially reduced by desiccation or dehydration.

One of the objects of my invention is to prevent or eliminate objectionable bio-chemical modification of the material during the process of imbibing water.

Another object of my invention is to aid and assist the imbibition of water by the dried organic tissue and retard bacterial spoilage during the imbibing period. In the case of dried egg substances, such as dried egg yolk or dried whole mixed eggs, the addition of the proper crystalloid during the soaking period has another effect, in that it creates an osmotic pressure and, by means of osmosis, it aids the hydration of the nitrogenous protein compounds and at the same time alters the dispersion of the colloidal protein compounds, producing a final colloidal suspension which is entirely different than if the water soluble crystalloid was not present.

I preferably accomplish my purpose by bringing the substantially dry material in contact with water and a sufficient proportion of water soluble crystalloid material to prevent objectionable bio-chemical action during the imbibition period. This may be accomplished in various ways.

If the dried material is in a finely powdered form, I mix with it a suitable proportion of a suitable crystalloid and immerse the mixture in the desired amount of aqueous medium. If the dried material is in the form of large flakes or pieces, I immerse the flaky material in an aqueous medium in which has been dissolved a sufficient proportion of edible, water soluble crystalloid material to prevent objectionable bio-chemical action.

Thus, by my invention, I produce a new and novel composition of matter consisting of substantially desiccated organic material in combination with a water soluble crystalloid capable of aiding the imbibition of water by the dry material and retarding or reducing bio-chemical or bacterial and other undesirable changes during the imbibing period. Also, by my invention, I produce a process for bringing the dry organic material in contact with water in the presence of a water soluble crystalloid.

In many industries, where egg material is used, it may be desirable to treat dried egg material to have an amount of moisture which is less than that usually present in the original egg material and, in this case, a smaller amount of moisture may be added to peptize the egg material than that present in the original material and thus a more concentrated product may be obtained.

For example, I may take 100 pounds of dried commercial egg yolk material and add to it 16 pounds of common table salt, mix it and store it in this manner until ready for use.

When ready for use, I may add 100 pounds of water to this mixture and allow the water to be in contact with the material until the protein material is properly peptized, dispersed in finely subdivided particles, not dissolved.

In place of yolk material, I may treat any other egg material such as the powdered whole egg or the powdered egg white and in place of the salt, in the case of dried egg whites, I use preferably other suitable crystalloids which will aid in the imbibition of water and reduce objectionable bio-chemical change during the period in which the imbibing takes place, such as powdered sucrose or dextrose. In the case of dried egg yolks or dried whole eggs, I may also use a sufficient quantity of water soluble carbohydrates, such as dextrose or sucrose, in sufficient proportion to raise substantially the osmotic pressure of the solution to increase the water imbibing capacity of dry material, or I may use mixtures of sodium chloride and water soluble carbohydrates.

Another example in which I may carry out my invention is as follows: I may use 100 parts of dried powdered egg yolk, mix it with 20 parts of powdered sodium chloride and about 1½ parts of powdered gum tragacanth. All the dry ingredients are thoroughly mixed and when this composition of matter is introduced into about 150 lbs. of water peptization will take place very readily without clumping and without bacteriological deterioration of the nitrogenous material. In place of the salt, I may use sugar in sufficient proportion, or I may use a mixture of salt and sugar in sufficient proportion, to raise sufficiently the osmotic pressure of the solution to hydrate the dry colloids effectively.

Whenever the hydrophyllic colloid is a nitrogenous substance, such as dried egg yolk or dried whole eggs, the use of sodium chloride as a water soluble crystalloid has additional advantage and acts in some cases differently than organic compounds such as cane sugar or dextrose. When the dried egg material is brought into contact with water containing sodium chloride in sufficient quantities, the sodium chloride does not only produce a greater osmotic pressure than equal quantities of cane sugar, but also has an effect upon the protein material itself, dispersing it in an entirely different manner than the organic water soluble carbohydrate, such as cane sugar or its equivalent. The ultimate hydrated product in which the sodium chloride is used as a substance to increase the osmotic pressure of the solution will differ than where cane sugar is used. Both sodium chloride and cane sugar in proper quantities will aid hydration, but the physical properties of the hydrated products will differ.

Another example of the application of my invention is to treat 5 lbs. of pimento flakes (dried pimentos) with 50 lbs. of water in which have been dissolved 5 lbs. of sodium chloride.

This mixture is allowed to stand, preferably in a covered container, until the pimento has imbibed sufficient water and the tissue has swelled up.

This hydrated pimento may then be used in this condition, or it may be rinsed in water to reduce its salt content.

In some instances, especially in the case of dried vegetables, I prefer to use an acid such as acetic, tartaric, citric, malic, phosphoric or some other edible acid as my edible water soluble crystalloid material. Or I may employ acid and salt, or acid and soluble carbohydrate. I also may use other substances such as glycerine and water soluble carbohydrate material such as dextrose and its equivalent as my edible water soluble crystalloid material.

In such materials as dried powdered vegetables or flaky dried vegetables where a certain amount of acid may be used, the acid is usually used in much smaller concentration so as not to denature the hydrophyllic colloid, usually about 1% of acid or less based upon the finished product is sufficient to prevent bi-chemical changes. Where acid is used, a certain amount of salt may be added, or sugar, or both, to increase substantially the osmotic pressure of the water used in hydration, and aid in the hydration.

I may also use other combinations of acids with non-acidic material capable of producing the said desired results.

What I claim as new and desire to protect by United States Letters Patent is:

1. The process of hydrating desiccated egg material which comprises forming a salt and edible acid solution in an aqueous liquid, the salt being present in insufficient concentration in itself to preserve the product bacteriologically, but the acid increasing the hydrogen ion concentration to a sufficient extent so that the solution will preserve the egg material bacteriologically during hydration, and introducing the desiccated egg material into the solution, the salt being present in sufficient amount to increase osmotic pressure so as to increase the rate of hydration.

2. The process of hydrating desiccated vegetable material which comprises forming a salt and edible acid solution in an aqueous liquid, the salt being present in insufficient concentration in itself to preserve the product bacteriologically, but the acid increasing the hydrogen ion concentration to a sufficient extent so that the solution will preserve the vegetable material bacteriologically during hydration, and introducing the desiccated vegetable material into the solution, the salt being present in sufficient amount to increase osmotic pressure so as to increase the rate of hydration.

3. The process of hydrating desiccated egg material which comprises forming a solution in an aqueous liquid of an edible acid and a substantially neutral edible crystalloid, the crystalloid being present in insufficient concentration in itself to preserve the product bacteriologically, but the acid increasing the hydrogen ion concentration to a sufficient extent so that the solution will preserve the egg material bacteriologically during hydration, and introducing the desiccated egg material into the solution, the crystalloid being present in sufficient amount to increase osmotic pressure so as to increase the rate of hydration.

4. The process of hydrating desiccated vegetable material which comprises forming a solution in an aqueous liquid of an edible acid and a substantially neutral edible crystalloid, the crystalloid being present in insufficient concentration in itself to preserve the product bacteriologically, but the acid increasing the hydrogen ion concentration to a sufficient extent so that the solution will preserve the vegetable material bacteriologically during hydration, and introducing the desiccated vegetable material into the solution, the crystalloid being present in sufficient amount to increase osmotic pressure so as to increase the rate of hydration.

5. The process of hydrating desiccated material of the class including desiccated egg material and desiccated vegetable material which comprises forming a solution in an aqueous liquid of an edible acid and a substantially neutral edible crystalloid, the crystalloid being present in insufficient concentration in itself to preserve the product bacteriologically, but the acid increasing the hydrogen ion concentration to a sufficient extent so that the solution will preserve the material bacteriologically during hydration, and introducing the desiccated material into the solution, the crystalloid being present in sufficient amount to increase osmotic pressure so as to increase the rate of hydration.

In witness whereof, I hereunto subscribe my name this 30th day of March, 1929.

BENJAMIN R. HARRIS.